(12) United States Patent
Failla

(10) Patent No.: US 7,658,974 B2
(45) Date of Patent: Feb. 9, 2010

(54) PROCESS FOR MAKING URETHANE-CONTAINING STRUCTURES AND THE STRUCTURES MADE THEREBY

(75) Inventor: Sebastiano Failla, Vigevano (IT)

(73) Assignee: Rohm and Haas Company, Philadelphia, PA (US)

( * ) Notice: Subject to any disclaimer, the term of this patent is extended or adjusted under 35 U.S.C. 154(b) by 646 days.

(21) Appl. No.: 11/113,713

(22) Filed: Apr. 25, 2005

(65) Prior Publication Data

US 2006/0240193 A1    Oct. 26, 2006

(51) Int. Cl.
 *B85D 3/02* (2006.01)
(52) U.S. Cl. ............... 427/385.5; 428/425.8; 528/54; 528/74.5; 528/76; 528/77; 528/80; 528/81; 528/83; 528/84; 528/85; 528/45; 422/46; 521/115; 521/167
(58) Field of Classification Search ............... 525/481; 528/44; 428/411.1, 425.8; 422/46; 521/115; 427/385.5
See application file for complete search history.

(56) References Cited

U.S. PATENT DOCUMENTS

| | | | | |
|---|---|---|---|---|
| 4,115,302 | A * | 9/1978 | Mao ............................ | 521/115 |
| 4,207,128 | A | 6/1980 | Traubel et al. | |
| 4,546,166 | A | 10/1985 | Niinomi et al. | |
| 4,657,743 | A * | 4/1987 | Kanno ......................... | 422/46 |
| 4,743,672 | A | 5/1988 | Goel | |
| 4,894,429 | A * | 1/1990 | Grogler et al. ............... | 528/45 |
| 4,933,416 | A * | 6/1990 | Gillis et al. ................. | 528/74.5 |
| 5,156,915 | A * | 10/1992 | Wilson et al. ............. | 428/425.8 |
| 5,360,543 | A | 11/1994 | Usifer et al. | |
| 5,380,768 | A * | 1/1995 | Cranston et al. ............ | 521/167 |
| 5,872,203 | A | 2/1999 | Wen et al. | |

| | | | |
|---|---|---|---|
| 2002/0068808 | A1 | 6/2002 | Kometani et al. |
| 2003/0212236 | A1 * | 11/2003 | Pellacani et al. .............. 528/54 |

FOREIGN PATENT DOCUMENTS

| | | |
|---|---|---|
| CA | 2295548 | 1/1999 |
| DE | 237 190 | 7/1986 |
| DE | 237 191 | 7/1986 |
| DE | 240 653 | 11/1986 |
| DE | 269 175 | 6/1989 |
| EP | 0 295 677 | 12/1988 |
| EP | 0 573 310 | 12/1993 |
| EP | 0 740 675 | 11/1996 |
| EP | 0 764 707 | 3/1997 |
| EP | 1 059 379 A2 | 12/2000 |
| EP | 740675 B1 | 11/2001 |
| GB | 2106526 A | 4/1983 |
| JP | 54129101 | 9/1993 |
| JP | 2002249534 | 6/2003 |
| WO | WO 99/02578 | 1/1999 |
| WO | WO 03/078534 | 9/2003 |

* cited by examiner

*Primary Examiner*—Michael Barr
*Assistant Examiner*—Andrew Bowman
(74) *Attorney, Agent, or Firm*—Carl P. Hemenway; Stephen T. Falk

(57) ABSTRACT

There is provided a two-pack composition for making urethane-containing structures, said composition comprising
 (a) a first pack comprising at least one reaction product of at least one polyisocyanate and at least one polyol, wherein said first pack has %NCO of 6% or greater, and
 (b) a second pack comprising at least one polyol and at least one amine catalyst,
wherein the reactive mixture formed by admixing said first pack and said second pack is capable of curing in the absence of water; and wherein said reactive mixture comprises less than 3% solvent by weight based on the weight of said reactive mixture. Also provided are methods of making such urethane-containing structures, and the urethane structures made thereby.

9 Claims, No Drawings

PROCESS FOR MAKING URETHANE-CONTAINING STRUCTURES AND THE STRUCTURES MADE THEREBY

BACKGROUND

A variety of useful structures are made of various layers bonded to each other. One class of such useful structures includes a layer of polyurethane material among the other layers. For example, a layer of polyurethane may be bonded to a flexible substrate, either directly or with other layers in between. Such structures may be used, for example, in place of leather in footwear, upholstery, apparel, sports equipment, or other places where leather has been used in the past. When such structures are suitable as replacements for leather, they are sometimes called "synthetic leather."

German Democratic Republic Patent Specification DD 237 191 describes polyurethane reactive systems involving a hydroxyl functional urethane prepolymer, an isocyanate functional urethane prepolymer, and an organotin catalyst. Organotin catalysts are sometimes undesirable because of their possible effects on safety and the environment. It is desired to make compositions that include at least one amine catalyst and that are suitable for making polyurethane-containing structures.

STATEMENT OF THE INVENTION

In one aspect of the present invention, there is provided a two-pack composition for making urethane-containing structures, said composition comprising
(a) a first pack comprising at least one reaction product of at least one polyisocyanate and at least one first compound with plural active hydrogens, wherein said first pack has % NCO of 1% or greater, and
(b) a second pack comprising at least one second compound with plural active hydrogens and at least one amine catalyst, wherein the reactive mixture formed by admixing said first pack and said second pack is capable of curing in the absence of water; and wherein said reactive mixture comprises less than 3% solvent by weight based on the weight of said reactive mixture.

In a second aspect of the present invention, there is provided a process for making urethane-containing structures comprising
(i) providing a two-pack composition comprising
  (a) a first pack comprising at least one reaction product of at least one polyisocyanate and at least one first compound with plural active hydrogens, wherein said first pack has % NCO of 1% or greater, and
  (b) a second pack comprising at least one second compound with plural active hydrogens and at least one amine catalyst,
(ii) forming a reactive mixture by admixing ingredients comprising said first pack and said second pack, wherein said reactive mixture is capable of curing in the absence of water; and wherein said reactive mixture comprises less than 3% solvent by weight based on the weight of said reactive mixture,
(iii) applying a layer of said reactive mixture to at least one substrate, and
(iv) curing said layer of said reactive mixture or allowing said layer of said reactive mixture to cure.

In a third aspect of the present invention, there is provided a urethane-containing structure made by a process comprising
(i) providing a two-pack composition comprising
  (a) a first pack comprising at least one reaction product of at least one polyisocyanate and at least one first compound with plural active hydrogens, wherein said first pack has % NCO of 1% or greater, and
  (b) a second pack comprising at least one second compound with plural active hydrogens and at least one amine catalyst,
(ii) forming a reactive mixture by admixing ingredients comprising said first pack and said second pack, wherein said reactive mixture is capable of curing in the absence of water; and wherein said reactive mixture comprises less than 3% solvent by weight based on the weight of said reactive mixture,
(iii) applying a layer of said reactive mixture to at least one substrate, and
(iv) curing said layer of said reactive mixture or allowing said layer of said reactive mixture to cure.

DETAILED DESCRIPTION

Compositions are said to "cure" as chemical reactions take place that desirably effect an increase in the molecular weight of the composition and/or effect crosslinking of the composition so as to improve the properties of the composition. Such chemical reactions are known as "curing reactions." The composition is said to be "cured" when such reactions are complete or when the composition has been in conditions that allow curing reactions to take place and the curing reactions have progressed sufficiently far that the properties of the composition are useful and are not appreciably changing over time. In some embodiments, the cured reactive mixture of the present invention is solid.

A "reactive mixture," as defined herein, is an admixture of two or more ingredients that is capable of undergoing cure. Some reactive mixtures will cure when left alone; some reactive mixtures cure when exposed to one or more conditions that promote curing, such as, for example, elevated temperature, radiation, other cure-promoting conditions, and combinations thereof. Some reactive mixtures are capable of curing when left alone at room temperature (25° C.) but cure more quickly when exposed to one or more cure-promoting conditions. Reactive mixtures may cure by undergoing a single type of chemical reaction or by a combination of chemical reactions that either proceed independently of each other, or that interact with each other, or both.

In the practice of the present invention, the reactive mixture is capable of curing in the absence of water. That is, the reactive mixture will cure without contact with water in any form (liquid, vapor, spray, fog, etc.). In the cure process of reactive mixtures of the present invention, the cure may be either retarded by water, unaffected by water, or enhanced by water. If water enhances the cure process, it is contemplated that the cure process is capable of occurring in the absence of water; the enhancement may occur because the water allows a separate cure reaction to take place, or because the water speeds up other cure reactions, or both.

The practice of the present invention involves the use of at least one compound with plural active hydrogens. "Plural" herein means two or more. "Active hydrogen" herein means a hydrogen atom attached to an electronegative atom such as, for example, oxygen or nitrogen. Some examples of active hydrogens are hydrogen atoms in hydroxyl groups, carboxyl groups, and amine groups. A compound with plural active hydrogens may have all active hydrogens of the same type (for example, all active hydrogens may be part of hydroxyl groups) or may have active hydrogens of different types. The functionality of a compound with plural active hydrogens is the number of active hydrogens per molecule.

One suitable class of compounds with plural active hydrogens is the class of polyols. A "polyol" as defined herein is a compound with two or more hydroxyl functional groups on each molecule. Polyols include a wide variety of compounds, some of which are described in *Polyurethane Handbook, 2nd edition*, edited by G. Oertel, Hanser Publishers, 1994. In addition to the hydroxyl functions, polyols may or may not contain one or more other functional groups, such as for example carbonyl, carboxyl, anhydride, unsaturation, other functional groups, or a combination thereof Suitable polyols include, for example, alkane diols (also called glycols), alkane triols, alkanes substituted with four or more hydroxyl groups, monoether polyols, polyether polyols, monoester polyols, polyester polyols, polyetherester polyols (sometimes called polyether ester polyols and/or polyester ether polyols), fatty polyols, and mixtures thereof Some suitable polyols are crystalline, and other suitable polyols are amorphous. Crystalline materials are those that show a detectable crystalline melting point in a Differential Scanning Calorimetry (DSC) test.

A suitable polyol may have primary hydroxyl groups or secondary hydroxyl groups or a combination thereof Also suitable are blends of polyols, including, for example, blends of one or more polyols having primary hydroxyl groups with one or more polyols having secondary hydroxyl groups.

Polyols are sometimes characterized by their "polyol equivalent weight" and by their "nominal molecular weight." The polyol equivalent weight is defined herein according to the definition given by K. Uhlig in *Discovering Polyurethanes*, published by Hanser Publishers, Munich, 1999 ("Uhlig"):

(polyol equivalent weight)=56×1000/(hydroxyl number).

The nominal molecular weight of a polyol is defined as the polyol equivalent weight times the functionality of the polyol. The functionality of a polyol is the number of hydroxyl groups per molecule.

Some suitable polyols are, for example, polyester polyols. A polyester polyol is a polyol that includes at least two ester linkages in each molecule. Suitable polyester polyols may be made from any ingredients, using any methods, as long as the result is a polyester polyol. Among suitable polyester polyols are, for example, those formed from diacids, or their monoester, diester, or anhydride counterparts, and diols. Polyester polyols formed using only diols and diacids are assumed herein to have functionality of 2. Diacids suitable for use in forming polyester polyols may be aliphatic or aromatic or a combination or mixture thereof; some embodiments use aliphatic diacids, including, for example adipic acid. Diols suitable for use in forming polyester polyols include, for example glycols and other aliphatic diols. In some embodiments, polyester polyols are used that have molecular weight of 400 or higher, or 600 or higher, or 1,000 or higher. Independently, in some embodiments, polyester polyols are used that have molecular weight of 10,000 or less; or 4,000 or less; or 2,000 or less.

Some other suitable polyols are, for example, polyether polyols. A polyether polyol is a polyol that includes at least two ether linkages in each molecule. Suitable polyether polyols may be made by any method, using any ingredients, as long as the result is a polyether polyol. Suitable polyether polyols include, for example, polyalkylene oxide polyols (also known as polyoxyalkylene polyols), including branched and unbranched alkylene groups, including, for example, polyoxyalkylene polyols in which the alkylene group has 2 to 6 carbon atoms. Examples of suitable polyether polyols include, for example, polyethylene oxide, (also known as polyethylene glycol), polypropylene oxide (also known as polypropylene glycol), polytetramethylene glycol, random or block copolymers of these polyethers, and mixtures thereof. Mixtures of the various suitable polyether polyols are also suitable for use in the present invention. In some embodiments, at least one polyether polyol is used that has molecular weight of 400 or more; or 750 or more; or 1,000 or more; or 2,000 or more; or 2,500 or more. In some embodiments, at least one polyether polyol is used that has molecular weight of 10,000 or less; or 5,000 or less; or 3,500 or less. In some embodiments, at least one polyether polyol is used that is a polypropylene glycol.

Also suitable as polyols are polyalkylene oxide/acrylic hybrid polyols and polycarbonate polyols.

Some additional other suitable polyols are, for example, fatty polyols. A fatty polyol is any polyol that contains one or more residues of fatty acids. Fatty acids are long-chain carboxylic acids, with chain length of at least 4 carbon atoms. In embodiments of the present invention in which fatty polyols are used, some suitable fatty polyols are castor oil, other natural or synthetic oils with two or more hydroxyl groups per molecule, fatty polyols derived therefrom, and mixtures thereof.

Some other suitable polyols are, for example, alkanes that do not include long chains (i.e., "short chain alkanes") and that have two or more hydroxyl groups. Such polyols include, for example, ethylene glycol (also known as monoethylene glycol), propylene glycol, butane diols, other alkane diols, glycerol, and mixtures thereof. In some embodiments, ethylene glycol is used.

Further suitable polyols are, for example, monoether polyols (i.e., compounds that have exactly one ether linkage in each molecule and that have two or more hydroxyl groups on each molecule), such as, for example, diethylene glycol, dipropylene glycol, other ether glycols, and mixtures thereof.

Mixtures of suitable polyols are also suitable. For example, in some embodiments, a mixture of at least one short-chain alkane having two hydroxyl groups with at least one polyester polyol is used. As another example, in some embodiments, a mixture of at least one short-chain alkane having two hydroxyl groups with at least one polyether polyol is used. Further mixtures of suitable polyols are also contemplated as suitable. For example, in some embodiments, a mixture is used that contains at least one short-chain alkane polyol; at least one polyol that is a polyester polyol, a polyether polyol, or a mixture of at least one polyester polyol and at least one polyether polyol; and, optionally, at least one other polyol.

The practice of the present invention involves the use of at least one polyisocyanate, which is defined herein as a compound bearing at least two isocyanate groups on each molecule. The functionality of a polyisocyanate, as defined herein, is the number of isocyanate groups on each molecule. If a mixture of isocyanate molecules is present, the functionality is the average number of isocyanate groups per molecule. Polyisocyanates which may be used include, for example, aromatic polyisocyanates, aliphatic (including, linear, branched, cyclic, and combinations thereof) polyisocyanates, and combinations and mixtures thereof Some embodiments use one or more of the following polyisocyanates: 4,4'-diphenylmethane diisocyanate (also called 4,4'-methylene bisphenyl diisocyanate or 4,4'-MDI), 2,4'-diphenylmethane diisocyanate (also called 2,4'-methylene bisphenyl diisocyanate or 2,4'-MDI), and mixtures thereof. Some embodiments use "pure MDI," which is a mixture of 4,4'-MDI with 2,4'-MDI that has a ratio of 4,4'-MDI to 2,4'-MDI of approximately 98/2 by weight. Some embodiments use 4,4'-MDI as the sole polyisocyanate.

In the practice of the present invention, the first pack contains at least one compound (herein called an "isocyanate prepolymer") that is formed by reacting at least one polyisocyanate with at least one compound with plural active hydrogens. Any compound with plural active hydrogens that is used in forming the first pack is known herein as a "first compound with plural active hydrogens." It is contemplated that at least one polyisocyanate and at least one compound with plural active hydrogens are mixed together and that conditions will be provided that allow them to react. Such conditions may include one or more of the following conditions: sufficient time to react; ambient temperature (15° C. to 30° C.); elevated temperature (50° C. or above, or 80° C. or above); agitation; exposure to one or more catalysts; exposure to one or more additional ingredients; and combinations thereof.

While the invention is not limited to a specific mechanism, it is contemplated that during the formation of the first pack, the active hydrogens of the compounds with plural active hydrogens react with the isocyanate groups of the polyisocyanate to form links such as, for example, amide links, urea links, urethane links, or combinations thereof.

In some embodiments, at least one compound with plural active hydrogens used in forming the first pack has functionality of 4 or lower; or 3 or lower; or 2. In some embodiments, at least one compound with plural active hydrogens used in forming the first pack has functionality from 2.5 to 3.2. In some embodiments, at least one compound with plural active hydrogens used in forming the first pack has functionality of 3. In some embodiments, at least one compound with plural active hydrogens used in forming the first pack is selected from polyester polyols, polyether polyols, and mixtures thereof.

In the mixture used for forming the first pack, a molar excess of isocyanate groups over active hydrogens is used. In some of such embodiments, the molar ratio of isocyanate groups to active hydrogens is 3 or more; or 5 or more; or 6 or more. In some embodiments, the molar ratio of isocyanate groups to active hydrogens is 15 or less; or 10 or less; or 8 or less. It is contemplated that the reaction forming the first pack may have just one product or it may have more than one product.

In some embodiments, the first pack will contain some wholly unreacted polyisocyanate molecules (i.e., molecules of polyisocyanate in which none of the isocyanate groups have reacted with compounds with active hydrogens). In other embodiments, the first pack will contain no wholly unreacted polyisocyanate molecules. In some embodiments, the first pack will contain all of the reaction product or products and all of any unreacted ingredients. In some embodiments, after the reaction has fully or partially taken place, some of the ingredients and/or reaction products may be separated from the remainder and used as the first pack.

The first pack contains % NCO of 1% or higher. As defined herein, "% CO" is the weight of unreacted isocyanate groups present in the first pack, as a percentage of the weight of the first pack. In some embodiments, the first pack has % NCO of 3% or higher; or 6% or higher; or 12% or higher. Independently, in some embodiments, the first pack has % NCO of 30% or less; or 20% or less; or 15% or less. The % NCO may be measured by any of a variety of well known tests. For example, one useful test is ASTM D2572-97 (2003) e1, published by ASTM International, 100 Bar Harbor Drive, PO Box C700, West Conshohocken, Pa., 19428-2959, USA.

A useful parameter for characterizing the first pack is the functionality of the first pack. To assess the functionality of the first pack, any molecules that have no isocyanate groups are ignored; among the molecules containing isocyanate groups, the functionality of the first pack is defined herein as number average of the isocyanate groups per molecule. In some embodiments, the functionality of the first pack is 2 or higher; or 2.5 or higher; or 3 or higher. In some embodiments, the functionality of the first pack is 10 or lower; or 5 or lower.

In some embodiments, the first pack has viscosity of 10,000 mPa*s or less at 60° C. Viscosity may be measured by any known means. One suitable method is a Brookfield RVT viscometer; in using the Brookfield viscometer, the spindle and rotation speed will be chosen using standard methods, depending on the properties of the material being measured, in order that the measurement of the instrument is between 50% and 80% of full scale. In some embodiments, the first pack has viscosity at 60° C. of 7,500 mPa*s or less; or 5,000 mPa*s or less; or 3,000 mPa*s or less. Independently, in some embodiments, the first pack has viscosity at 60° C. of 10 mPa*s or more; or 30 mPa*s or more; or 100 mPa*s or more; or 300 mPa*s or more. It is contemplated that if the viscosity is measured at a temperature lower than 60° C., the viscosity at 60° C. will be lower than the viscosity measured at the lower temperature.

The second pack of the present invention contains at least one amine catalyst. A catalyst, as used herein, is any compound that is effective at increasing the rate of a curing reaction. In some embodiments, the catalyst is effective at increasing the rate of reaction between active hydrogens and isocyanate groups. In some embodiments, the catalyst is effective at increasing the rate of reaction between hydroxyl groups and isocyanate groups to form urethane links. Some suitable amine catalysts are, for example, cyclic amines and tertiary amines, including, for example, diazabicyclo compounds such as, for example, 1,4-diazabicyclo[2.2.2]octane (also called triethylene diamine) and 1,8-diazabicyclo[5.4.0]undec-7-ene (also called DBU). Mixtures of suitable amine catalysts are also suitable.

In some embodiments, the second pack contains no catalyst other than the one or more amine catalysts. In other embodiments, the second pack contains, in addition to at least one amine catalyst, one or more additional catalysts. Some suitable additional catalysts are, for example, organometallic compounds. The metal atom in suitable organometallic compounds may be any metal capable of forming compounds with organic groups; in some embodiments, for example, the metal is nickel, tin, zinc, bismuth, or a mixture thereof. Some suitable organometallic compounds are those, for example, that have the following structure:

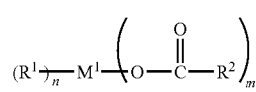

where $M^1$ is a metal; n is 0, 1, 2, or 3; m is 1, 2, 3, or 4; the $R^1$ groups may be the same as each other or different from each other; the $R^2$ groups may be the same as each other or different from each other; each $R^1$ is an alkyl group; and each $R^2$ is an organic radical that is chosen from hydrocarbons and substituted hydrocarbons. In some embodiments, n is not zero, at least one $R^1$ is an alkyl group with 6 or fewer carbon atoms, and at least one $R^2$ is an alkyl group with more than 6 carbon atoms; such compounds include, for example, dialkyltindicarboxylates (such as, for example, dibutyltindilaurate) and dialkylnickeldicarboxylates. Independently, in some embodiments, n is 0 and each R2 is an alkyl group with more than 6 carbon atoms; examples of such compounds are zinc neodecanoate, bismuth 2-ethylhexanoate, and bismuth neodecanoate. Independently, in some embodiments, no tin compound is used. Independently, in some embodiments, the organic groups of the organometallic compound do not include acetylacetonate groups. Independently, in some embodiments, the organic groups do not contain any sulfur atoms.

Mixtures of suitable additional catalysts are also suitable.

In the practice of the present invention, the second pack contains at least one compound with plural active hydrogens. A compound with plural active hydrogens contained in the second pack is known herein as a "second compound with plural active hydrogens." The one or more compound with plural active hydrogens in the second pack may be the same as or different from any or all of the one or more compound with plural active hydrogens used in forming the first pack. In some embodiments, the second pack contains at least one polyol. In some embodiments, every compound with plural active hydrogens in the second pack is a polyol.

In some embodiments of the present invention, at least one second compound with plural active hydrogens is a compound that has no urethane links. In some embodiments, each second compound with plural active hydrogens is a compound that has no urethane links. In some embodiments, the second pack contains at least one compound with plural active hydrogens that also has no amide links or urea links. Also contemplated are embodiments in which the second pack contains at least one compound with plural active hydrogens that has no links formed by the reaction of an isocyanate with an active hydrogen. In some embodiments, the compounds with plural active hydrogens in the second pack are all chosen from polyester polyols, polyether polyols, monoether polyols, alkane diols, and mixtures thereof.

In some embodiments of the present invention, at least one second compound with plural active hydrogens is a compound (herein called an "active hydrogen prepolymer") that is formed by reacting at least one polyisocyanate with at least one compound with plural active hydrogens. The ingredients and methods (such as heating, mixing, etc.) described herein above for making an isocyanate prepolymer are also suitable for making an active hydrogen prepolymer. A compound with plural active hydrogens that is used in forming an active hydrogen prepolymer is called herein a "third compound with plural active hydrogens." In making an active hydrogen prepolymer, the relative amounts of the ingredients are chosen so that the resulting active hydrogen prepolymer has no effective amount of unreacted isocyanate and so that the resulting active hydrogen prepolymer has plural active hydrogens. In some embodiments that use an active hydrogen prepolymer, the active hydrogen prepolymer has OH number of 10 or greater mg of KOH per gram of active hydrogen prepolymer.

A useful parameter for characterizing the second pack is the functionality of the second pack. To assess the functionality of the second pack, any molecules that have no active hydrogens are ignored. Among the molecules containing active hydrogens, the functionality of the second pack is defined herein as the number average of the active hydrogens per molecule. In some embodiments, the functionality of the second pack is 2 or higher; or 2.5 or higher; or 3 or higher. In some embodiments, the functionality of the second pack is 10 or lower; or 5 or lower.

In some embodiments of the present invention, the sum of the weights of all catalysts in the second pack, as a percentage based on the sum of the weights of all compounds with plural active hydrogens, is 0.01% or higher; or 0.03% or higher; or 0.1% or higher. In some embodiments of the present invention, the sum of the weights of all catalysts in the second pack, as a percentage based on the sum of the weights of all compounds with plural active hydrogens, is 1.6% or lower; or 0.8% or lower; or 0.4% or lower.

In the practice of the present invention, embodiments are contemplated that have any combination of the functionality of the first pack and the functionality of the second pack. The first pack might have higher functionality than the second pack, or the first pack might have a lower functionality than the second pack, or the first pack and the second pack might have the same functionality. In some embodiments in which the functionality of the first pack is the same as the functionality of the second pack, that functionality is higher than 2; or that functionality is 2.5 or higher; or that functionality is 3 or higher. In some embodiments, that functionality is 10 or lower; or 5 or lower.

One useful way to characterize some embodiments of the present invention is to describe some of the materials used in forming the first pack and some of the materials used in the second pack or used in forming the second pack. Some examples are the following:

In some embodiments, the first pack is formed using at least one polyether polyol with functionality greater than 2.1, and the second pack contains at least one polyether polyol with functionality of 2. Independently, in some embodiments, the first pack is formed using at least one polyester polyol with functionality greater than 2.1, and the second pack contains at least one polyester polyol with functionality of 2. Independently, in some embodiments, the first pack is formed using at least one polyether polyol, and the second pack contains at least one polyether polyol with the same functionality as at least one polyol used to form the first pack. Independently, in some embodiments, the first pack is formed using at least one polyester polyol, and the second pack contains at least one polyester polyol with the same functionality as at least one polyol used to form the first pack.

Independently, in some embodiments that involve the use of at least one active hydrogen prepolymer, at least one third compound with plural active hydrogens has the same functionality as at least one first compound with plural active hydrogens. Independently, in some embodiments that involve the use of at least one active hydrogen prepolymer, at least one first compound with plural active hydrogens has lower functionality than at least one third compound with plural active hydrogens. Independently, in some embodiments that involve the use of at least one active hydrogen prepolymer, at least one third compound with plural active hydrogens has lower functionality than at least one first compound with plural active hydrogens.

Independently, in some embodiments that involve the use of at least one active hydrogen prepolymer, at least one third compound with plural active hydrogens is a polyether polyol and at least one first compound with plural active hydrogens is a polyether polyol. Also contemplated are embodiments in which at least one third compound with plural active hydrogens is a polyester polyol and at least one first compound with plural active hydrogens is a polyester polyol.

Independently, in some embodiments, the first pack is formed using at least one polyether polyol, and the second pack contains at least one polyether polyol with nominal molecular weight less than the nominal molecular weight of at least one polyether polyol used in forming the first pack.

Independently, in some embodiments, the first pack is formed using at least one polyester polyol, and the second pack contains at least one polyester polyol with nominal molecular weight less than the nominal molecular weight of at least one polyester polyol used in forming the first pack. Independently, in some embodiments, the first pack is formed using at least one polyether polyol, and the second pack contains at least one polyether polyol with the same nominal molecular weight as at least one polyol used to form the first pack. Independently, in some embodiments, the first pack is formed using at least one polyester polyol, and the second pack contains at least one polyester polyol with the same nominal molecular weight as at least one polyol used to form the first pack.

Independently, in some embodiments that involve the use of at least one active hydrogen prepolymer, at least one third compound with plural active hydrogens has the same nominal molecular weight as at least one first compound with plural active hydrogens. Among such embodiments are contemplated embodiments in which at least one third compound with plural active hydrogens is a polyether polyol and at least one first compound with plural active hydrogens is a polyether polyol. Also among such embodiments are contemplated embodiments in which at least one third compound with plural active hydrogens is a polyester polyol and at least one first compound with plural active hydrogens is a polyester polyol.

When two materials are said herein to have "the same functionality," it is meant that the ratio of the two functionalities is between 0.95 and 1.05. Similarly, if one material is said herein to have functionality lower than the functionality of another material, the ratio of the functionality of the one material to the functionality of the other material is less than 0.95.

When two polyester polyols or two polyether polyols are said herein to have "the same nominal molecular weight" as each other, it is meant that the ratio of the two nominal molecular weights is between 0.95 and 1.05. Similarly, if one polyester polyol or polyether polyol is said herein to have nominal molecular weight less than the nominal molecular weight of another polyester polyol or polyether polyol, it is meant that the ratio of the nominal molecular weight of the one polyester polyol or polyether polyol to the nominal molecular weight of the other polyester polyol or polyether polyol is less than 0.95.

In some embodiments, the second pack has viscosity of 10,000 mPa*s or less at 45° C., as measured by the same methods discussed herein above for measuring the viscosity of the first pack. In some embodiments, the second pack has viscosity at 45° C. of 7,500 mPa*s or less; or 5,000 mPa*s or less; or 2,000 mPa*s or less; or 1,000 mPa*s or less. Independently, in some embodiments, the second pack has viscosity at 45° C. of 1 mPa*s or more; or 3 mPa*s or more; or 10 mPa*s or more; or 30 mPa*s or more. It is contemplated that if the viscosity is measured at a temperature lower than 45° C., the viscosity at 45° C. will be lower than the viscosity measured at the lower temperature.

In some embodiments, the second pack has hydroxyl number (also called "OH number") of 50 mg of KOH per gram of second pack or higher; or 100 mg of KOH per gram of second pack or higher; or 200 mg of KOH per gram of second pack or higher. Independently, in some embodiments, the second pack has OH number of 1,000 mg of KOH per gram of second pack or lower; or 750 mg of KOH per gram of second pack or lower; or 500 mg of KOH per gram of second pack or lower.

In some embodiments, the second pack contains at least one polyol of functionality 3 or higher. In some embodiments, the second pack contains a mixture of polyols, some with functionality of 2 and some with functionality of 3. In some embodiments, all of the polyols in the second pack have functionality of 2.

In some embodiments, the second pack contains at least one alkane diol and at least one polyol that is a polyester polyol, a polyether polyol, or a mixture thereof.

In the practice of the present invention, the ratio of the weight of the first pack to the weight of the second pack is 0.2 or greater. In some embodiments, the ratio of the weight of the first pack to the weight of the second pack is 0.5 or greater; or 0.8 or greater; or 1 or greater. Independently, in some embodiments, the ratio of the weight of the first pack to the weight of the second pack is 10 or less; or 7 or less; or 5 or less; or 3 or less; or 2 or less.

The first pack of the present invention is storage stable. That is, it can be stored for a storage period at ambient temperature (15° C. to 30° C.) without significant change in % NCO and without significant change in viscosity. In some embodiments, the ratio of final (i.e., after storage) % NCO to initial (i.e., immediately after forming the first pack and before storage) % NCO will be from 0.5 to 2.0; in some embodiments, this % NCO ratio will be from 0.7 to 1.5. In some embodiments, the ratio of final viscosity to initial viscosity will be from 0.5 to 5.0; in some embodiments, this viscosity ratio will be from 0.7 to 3.0. The first pack can be stored without significant change in % NCO and without significant change in viscosity for 30 days or more; or 60 days or more; or 90 days or more.

The second pack of the present invention is storage stable. That is, it can be stored for a storage period at ambient temperature (15° C. to 30° C.) without significant change in viscosity. In some embodiments, the ratio of final viscosity to initial viscosity will be from 0.5 to 2.0; in some embodiments, this viscosity ratio will be from 0.7 to 1.5. The second pack can be stored without significant change in viscosity for 90 days or more; or 180 days or more; or 365 days or more.

In some embodiments, the present invention involves the use of one or more additional conventional ingredients such as fillers, pigments, tackifiers, plasticizers, rheology modifiers, polymers (including, for example, thermoplastic resins), dehydrating agents (including, for example, silanes), stabilizers (such as, for example, orthophosphoric acid), benzoyl chloride, ultraviolet indicators, etc. It is contemplated that conventional ingredients are neither isocyanates, compounds with plural active hydrogens, nor catalysts. If such additional conventional ingredients are used, they are chosen and used with due regard to the reactivities of the active hydrogens and the isocyanate groups, which are desirably maintained. If such additional conventional ingredients are used, they may be added, individually or in any combination, to the first pack, to the second pack, to the admixture of the first pack and the second pack, or to a combination thereof. If such additional conventional ingredients are used, they may be added, individually or in any combination, before the other ingredients, after the other ingredients, during the formation of the first pack, during the formation of the second pack, during the formation of the admixture of the first pack and the second pack, to the admixture of the first pack and the second pack, or a combination thereof.

The process of admixing the first pack and the second pack may be performed in any manner. For example, the first pack and the second pack may be mixed dynamically; that is, an object such as, for example, a bar or impeller may be mechanically driven within the mixture, for example by magnetic forces or by a rotating shaft. For another example, the first pack and the second pack may driven by a pressure gradient to travel through a tube or other channel containing a static mixing device. Also contemplated are multiple manners of admixing, including repeating the same manner of admixing more than once, and including combinations of manners of admixing.

In the practice of the present invention, the reactive mixture contains less than 3% by weight solvent, based on the weight of the reactive mixture. "Solvent," as used herein, is any compound that has a normal boiling point between 10° C. and 110° C., that is miscible with at least one of the compounds with plural active hydrogens or at least one of the polyisocyanates present in the present invention, and that does not participate in the cure reaction. In some embodiments, the reactive mixture contains less than 2% solvent by weight, based on the weight of the reactive mixture, or less than 1%, or less than 0.5%.

In the practice of the present invention, the reactive mixture contains less than 3% by weight volatile liquids, based on the weight of the reactive mixture. "Volatile liquid," as used herein, is any compound with a normal boiling point between 10° C. and 110° C. that does not participate in the cure reaction. In some embodiments, the reactive mixture contains less than 2% volatile liquids by weight, based on the weight of the reactive mixture, or less than 1%, or less than 0.5%.

In some embodiments, the reactive mixture is heated in order to achieve a viscosity suitable for transporting the reactive mixture, such as by pumping or gravity feed, to the application equipment and for the application of the reactive mixture to a substrate. The temperature should be high enough to achieve a suitable viscosity but low enough to avoid excessive degradation or other undesirable effects on the reactive mixture. In some embodiments, the reactive mixture is transported or applied to the substrate or both at ambient temperature (between 15° C. and 30° C.).

The application of reactive mixture to substrate may be effected by conventional means such as, for example, spray applicator, bead applicator, nozzle, doctor blade, extrusion, or roll coater, to form a continuous or discontinuous layer of reactive mixture, as desired. The reactive mixture may alternatively or additionally be applied to the substrate by hand, for example with a hand-held tool such as, for example, a spatula, hand-held metering device, or other applicator.

In some embodiments, the reactive mixture is applied to substrate using a hollow coating blade. In such embodiments, the reactive mixture is inserted into a volume inside the coating blade; the reactive mixture then passes out of an aperture in the hollow coating blade and is thus deposited onto substrate. One known hollow coating blade is model RTS, from TECNOINCOLLAGGI, in Zanica, Italy.

The reactive mixture may typically be applied at a level of 5 $g/m^2$ to 150 $g/m^2$.

In the practice of the present invention, at least one layer of a reactive mixture is applied to a substrate and that layer is cured or allowed to cure. The process of curing or allowing to cure may take place at ambient temperature (15° C. to 30° C.) or at elevated temperature, which may be above 30° C. or above 50° C. The curing or allowing to cure, in some embodiments, takes place at more than one temperature; temperature may change gradually or suddenly. In some embodiments, the process of curing or allowing to cure takes place at temperature below 225° C., or below 175° C., or below 155° C., or below 125° C., or below 100° C.

After reactive mixture is applied to a substrate and cured or allowed to cure, at least one of the resulting layers of cured reactive mixture is compact (i.e., it is not a foam). To distinguish a compact material from a foam, the density can be measured. The density of compact material is 0.9 $g/cm^3$ or greater. In some embodiments, the density of the compact material is 0.95 $g/cm^3$ or greater, or 1.0 $g/cm^3$ or greater. In some embodiments, the density of the compact material will be 5 $g/cm^3$ or less, or 3 $g/cm^3$ or less, or 2 $g/cm^3$ or less. Among embodiments where the reactive mixture contains less than 1% by weight volatile compounds based on the weight of the reactive mixture, it is contemplated that the density of the reactive mixture will be approximately the same as or somewhat lower than the density of the cured reactive mixture. Further, it is contemplated that the density of the reactive mixture will be the weighted average of the densities of the ingredients that are mixed to make the reactive mixture (i.e., the first pack, the second pack, and any optional additional ingredients).

The substrates used in the practice of the present invention may be any of a wide variety of materials. In some embodiments, at least one substrate is a thin, flexible material such as, for example, plastic film, woven fabric, nonwoven fabric, paper, or a mixture or combination thereof Substrate may be coated or uncoated. Substrate may be treated (for example, mechanically roughened, subjected to corona discharge, or chemically treated) or untreated. When a coating is applied to a thin, flexible substrate, the resulting structure is known as a "laminate." Laminates also include a variety of relatively thin, flexible structures, such as, for example, structures with substrates with more than one coating; and structures with more than one substrate and at least one coating, in which the coating or coatings may be between the substrates or on the exposed surface of one or more substrate or any combination thereof.

In some embodiments, exactly one layer is applied to a substrate, and that layer is a composition of the present invention. In other embodiments, more than one layer is applied; at least one layer is a composition of the present invention; other layers may or may not, independent of each other, be compositions of the present invention. The layers may be applied in any order; thus, a layer that is a composition of the present invention may be applied directly to the substrate, or it may be applied to the substrate on top of a layer of a different composition. If more than one layer that is a composition of the present invention is applied, such layers may be identical to each other or different from each other. In some embodiments, two or more of the layers that are applied are compositions of the present invention.

For example, in one embodiment, a composition of the present invention is applied to a fabric (either woven or nonwoven) and cured or allowed to cure. The resulting structure is useful, for example, as a replacement for leather.

For another example, two or three or more layers are applied on top of each other on a fabric (either woven or nonwoven). In the practice of the present invention, at least one of the layers is a composition of the present invention. Each layer may or may not be partially or fully cured before the application of the next layer. If a layer has more than 3% by weight, based on the weight of that layer, solvent, it is contemplated that that layer will be dried before application of the next layer. Before the structure is put to use, the layer or layers that have composition of the present invention will be cured or allowed to cure. The resulting structure is useful, for example, as a replacement for leather.

Some embodiments of the present invention involve the use of release substrates. A release substrate is one from which the composition of the present invention, after it has cured, may be easily separated without damage to either the cured composition of the present invention or to the substrate. Some examples of release substrates are films of polymers having low surface energy (such as, for example, fluorinated alkylene polymers and silicone polymers) and paper or other substrate coated with such polymers.

For an example of the practice of the present invention, one or two or three or more layers are applied on top of each other on a release substrate. In the practice of the present invention, at least one of the layers is a composition of the present invention. Each layer may or may not be partially or fully cured before the application of the next layer. If a layer has more than 3% by weight, based on the weight of that layer, solvent, it is contemplated that that layer will be dried before application of the next layer. Then a fabric (either woven or nonwoven) is applied on top of the other layers. Then the release substrate is removed. Before the structure is put to use, the layer or layers that have composition of the present invention will be cured or allowed to cure. The resulting structure is useful, for example, as a replacement for leather.

In one embodiment, a composition of the present invention is applied to a release substrate. A fabric (either woven or nonwoven) is applied to the layer of composition of the present invention, and the composition of the present invention is cured or allowed to cure. The resulting structure is useful, for example, as a replacement for leather In one embodiment, a composition known as a "topcoat," which may or may not be a composition of the present invention, is applied to a release substrate, and the topcoat layer is dried (if it contains solvent) and is partially or fully cured. Then one or more subsequent layers is applied to the substrate on top of the layer of the topcoat, and the subsequent layer or layers are partially or fully cured. At least one of the subsequent layer or layers is a composition of the present invention. Then a fabric (either woven or nonwoven) is applied on top of the other layers. All compositions of the present invention are cured or allowed to cure. The release substrate is then separated from the topcoat; the release substrate is removed, and the remaining construction is a coated fabric that is useful, for example, as a substitute for leather.

Also contemplated are embodiments in which one or more layers of the reactive mixture of the present invention is applied to leather. For example, a layer of the reactive mixture of the present invention can be applied to split leather as a finish coating.

Also contemplated, for example, are embodiments like those described herein above, where additional layers are applied, either before or after those already described.

It is contemplated that any of the structures described herein above may be useful for a wide variety of uses. Many of those uses are items for which, currently, leather is often used. For example, some structures of the present invention are useful for making footwear, and some structures of the present invention are useful for making upholstery.

Additionally, structures of the present invention may be used in other ways, whether or not leather had formerly been employed for that use.

It is to be understood that for purposes of the present specification and claims that the range and ratio limits recited herein can be combined. For example, if ranges of 60 to 120 and 80 to 110 are recited for a particular parameter, then the ranges of 60 to 110 and 80 to 120 are also contemplated. For another example, if minimum values for a particular parameter of 1, 2, and 3 are recited, and if maximum values of 4 and 5 are recited for that parameter, then it is also understood that the following ranges are all contemplated: 1 to 4, 1 to 5, 2 to 4, 2 to 5, 3 to 4, and 3 to 5.

EXAMPLES

In the Examples below, the following materials were used:
AA=adipic acid
DEG=diethylene glycol
TMP=trimethylol propane
DABCO™ T 12=dibutyl tin dilaurate (Air Products)
DABCO™ 33LV=33% triethylene diamine, 67% dipropylene glycol (Air Products)
Vithane™ 3948=WB polyurethane (aliphatic aqueous polyurethane skin) (Rohm & Haas)
Vithane™ 3936=WB polyurethane (Aliphatic aqueous polyurethane topcoat) (Rohm & Haas)
Foamkill 614=FOAMKILL 614, Defoamer (Rohm & Haas)
Vithaderm™ AS 42=Wetting leveling agent (Rohm & Haas)
Vithane™ AD 8035=Urethane thickener for aqueous polyurethanes (Rohm & Haas)
Icolor™ W 32 Blue=Water based pigment at high concentration (Rohm & Haas)
Icolor™ W 25 Black=Water based pigment at high concentration (Rohm & Haas)
Icopor™ IK 304 Bleu=Unsaturated polyester based pigment (Rohm & Haas)
I 459 Yellow=Polyol based pigment (Marbo)
Casting Paper 143=Asahi Release AR 143 MATT from ASAHI
Casting Paper 169=Asahi Release AR 169 MATT from ASAHI
Backing 1=Coagulate Textile, thickness 1.1 mm, from Nuova Mabel
Backing 2=Textile Brescia (cotton) from Nuova Mabel In the Examples below, test methods labeled "UNI" are published by Ente Nazionale Italiano di Unificazione (Italian National Body for Unification), Sede di Milano/Milan Headquarter, via Battistotti Sassi 11B, 20133 Milano MI, Italy. Test methods labeled "SATRA" are published by SATRA Technology Centre, SATRA House, Rockingham Road, Kettering, Northamptonshire, NN169JH, United Kingdom. Test methods labeled "ISO" are published by the International Orgainzation for Standardization, 1, rue de Varembé, Case postale 56, CH-1211 Geneva 20, Switzerland.

Example 1

A polyester-polyether polyurethane coating on textile was made.

First, a topcoat was prepared as follows:

| Ingredient | % by weight |
| --- | --- |
| Vithane 3948 | 80.00 |
| Vithane 3936 | 20.00 |
| Foamkill 614 | 0.10 |
| Vithaderm AS 42 | 0.30 |
| Vithane AD 8035 | 0.40 |
| W 25 BK Icolor Black | 0.30 |

The topcoat was coated onto Casting Paper Petalo Silver (by CdC Favini Group) and heated in an oven at 120° C. for 2 minutes. Wet coat weight was 20 g/m$^2$, and dry coat weight was 12 g/m$^2$.

A first pack was prepared as follows:

469 g of 4,4'-diphenylmethane diisocyanate are added, under dry nitrogen, to 530.9 g of a polyester polyol (based on AA, DEG, TMP), with a functionality of 2.72 and with 920 equivalent weight, in a 3 l flask in a heating bath equipped with a stirrer, a thermometer and a reflux condenser. The reaction mixture is stirred at 80° C. until the theoretical % NCO is reached. This product had a NCO of 13.2%, Brookfield viscosity of 2500 mPa*s at 60° C. (spindle #3, 20 rpm), density of 1.18 g/cm³ at 60° C., and 100% solid content.

A second pack was prepared as follows:

886 g of a polyester polyol (based on AA, DEG, TMP), with a functionality of 2 and with 500 equivalent weight, 110.4 g mono ethylene glycol, 0.80 g dibutyl tin dilaurate and 2.7 g DABCO™ 33 LV (triethylene diamine in dipropylene glycol) are mixed together and blanketed with dry nitrogen.

This product had calculated average OH number of 300 mgKOH/g, Brookfield viscosity of 250 mPa*s at 60° C. (spindle #3, 100 rpm), density of 1.10 g/cm³ at 60° C., and 100% solid content, and calculated average OH number of 300 mgKOH/g.

A skin coating was prepared by mixing for 10 seconds with a Cowles mixer, 63.65 g of the first pack (heated at 60° C.) and 36.35 g of the second pack (heated at 45° C.) with 2.0 g of pigment paste (Icopor™ IK 304 Bleu). The skin coating was immediately applied on the topcoat at coat weight of 60 g/m² using a blade thickness equal to 0.06 mm. The skin coating was heated into an oven at temperature of 120° C. for 2 minutes.

A subsequent first pack was prepared, as follows:

466.6 g of 4,4'-diphenylmethane diisocyanate are added, under dry nitrogen, to 533.2 g of a polyether polyol (polypropylene glycol), with a functionality of 3 and with 1000 equivalent weight, and 0.14 g phosphoric acid in a 3 l flask in a heating bath equipped with a stirrer, a thermometer and a reflux condenser. The reaction mixture is stirred at 80° C. until the theoretical % NCO is reached. This product had a NCO of 13.4%, Brookfield viscosity of 650 mPa*s at 45° C. (spindle #4, 100 rpm), density of 1.09 g/cm³ at 45° C., and 100% solid content.

A subsequent second pack was prepared, as follows:

888.5 g of a polyether polyol (polypropylene glycol), with a functionality of 2 and with 500 equivalent weight, 108.1 g mono ethylene glycol, 0.79 g dibutyl tin dilaurate and 2.6 g DABCO™ 33 LV (triethylene diamine in dipropylene glycol) are mixed together and blanked with dry nitrogen. This product had calculated average OH number of 249 mgKOH/g, Brookfield viscosity of 190 mPa*s at 25° C. (spindle #3, 100rpm), density of 1.015 g/cm³ at 25° C., and 100% solid content, and calculated average OH number of 249 mgKOH/g.

An adhesive coating was prepared by blending for 10 sec. with a Cowles™ mixer, 62.12 g of the subsequent first pack (heated at 45° C.) and 37.88 g of the subsequent second pack with 0.50 g of pigment paste (Icopor™ IK 304 Bleu). This adhesive was immediately coated onto the skin layer at coat weight of 50 g/m². Then the Backing 2 was laminated onto the layer of adhesive and the structure was heated in an oven at 120° C. for 2 minutes. Then the Casting Paper was separated from the remainder of the structure.

Example 2

A polyester-polyether polyurethane coating on coagulated polyurethane was made.

First, a top coat was prepared as in Example 1.

The topcoat was coated onto Casting Paper Petalo Silver (by CdC Favini Group) and heated in an oven at 120° C. for 2 minutes. Wet coat weight was 20 g/m², and dry coat weight was 12 g/m².

A first pack was prepared as in Example 1.

A second pack was prepared as in Example 1.

A skin coating was prepared by mixing for 10 seconds with a Cowles™ mixer, 63.65 g of the first pack (heated at 60° C.) and 36.35 g of the second pack (heated at 45° C.) with 2.0 g of pigment paste (Icopor™ IK 304 Bleu). The skin coating was immediately applied on the topcoat at coat weight of 25 g/m² using a blade thickness equal to 0.025 mm. The skin coating was heated into an oven at temperature of 120° C. for 2 minutes.

A subsequent first pack was prepared as in Example 1.

A subsequent second pack was prepared as in Example 1.

An adhesive coating was prepared by blending, with a Cowles™ mixer, 62.12 g of the subsequent first pack (heated at 45° C.) and 37.88 g of the subsequent second pack with 0.50 g of pigment paste (Icopor™ IK 304 Bleu). This adhesive was immediately coated onto the skin layer at coat weight of 15 g/m². Then the Backing 1 was laminated onto the layer of adhesive and the structure was heated in an oven at 120° C. for 2 minutes. Then the Casting Paper was separated from the remainder of the structure.

Example 3

A polyester polyurethane coating on coagulated polyurethane was made. First, a top coat was prepared as follows:

| Ingredient | % by weight |
| --- | --- |
| Vithane 3948 | 65.00 |
| Vithane 3936 | 15.00 |
| Foamkill 614 | 0.20 |
| Vithaderm AS 42 | 0.50 |
| Vithane AD 8035 | 0.40 |
| W 32 Icolor ™ Blue | 2.50 |
| Water | 10.00 |

The topcoat was coated onto Casting Paper 169 and heated in an oven at 80° C. for 1.3 minutes and then 110° C. for 1.3 minutes. Wet coat weight was 40 g/m², and dry coat weight was 12 to 15 g/m².

A first pack was prepared as in Example 1.

A second pack was prepared in Example 1.

An adhesive coating was prepared by mixing the first pack (heated at 60° C.) and the second pack with pigment paste (heated at 45° C.), as follows:

| Ingredient | % by weight |
| --- | --- |
| first pack | 59.15 |
| second pack | 33.85 |
| I459 Yellow | 7.00 |

The adhesive coating was applied, by using a mixer machine equipped with a static mixer, to the substrate on the topcoat at coat weight of 80 g/m² using a blade thickness equal to 0.08 mm. Then the Backing 1 was laminated onto the layer of adhesive while the coating machine speed was maintained at 2.0 m/min, and the structure was heated in an oven at 130° C. for 11 minutes. Then the Casting Paper was separated from the remainder of the structure.

Example 4

A polyester-polyether polyurethane coating on textile was made. First, a top coat was prepared as follows:

| Ingredient | % by weight |
|---|---|
| Vithane 3948 | 65.00 |
| Vithane 3936 | 15.00 |
| Foamkill 614 | 0.20 |
| Vithaderm AS 42 | 0.50 |
| Vithane AD 8035 | 0.40 |
| W 32 Icolor ™ Blue | 2.50 |
| Water | 10.00 |

The topcoat was coated onto Casting Paper 169 and heated in an oven at 80° C. for 1.3 minutes and then 110° C. for 1.3 minutes. Wet coat weight was 50 g/m², and dry coat weight was 16 to 18 g/m².

A first pack was prepared as in Example 1.

A second pack was prepared as follows:

888.1 g of a polyester polyol (based on AA, DEG, TMP), with a functionality of 2 and with 500 equivalent weight, 110.7 g mono ethylene glycol, 0.26 g dibutyl tin dilaurate and 0.9 g DABCO™ 33 LV (triethylene diamine in dipropylene glycol) are mixed together and blanked with dry nitrogen.

This product had calculated average OH number of 300 mgKOH/g, Brookfield viscosity of 250 mPa*s at 60° C. (spindle 3, 100 rpm), density of 1.10 g/cm³ at 60° C., and 100% solid content.

A skin coating was prepared by mixing the first pack and the second pack with pigment paste, as follows:

| Ingredient | % by weight |
|---|---|
| first pack | 59.15 |
| second pack | 33.85 |
| I 459 Yellow | 7.00 |

The skin coating was applied, by using a mixer machine equipped with a static mixer, to the substrate on the topcoat at coat weight of 70 g/m² using a blade thickness equal to 0.07 mm and a coating machine speed equal to 2.0 m/min. The skin coating was heated at an oven temperature of 130° C. for 15 minutes.

A subsequent first pack was prepared as in Example 1.

A subsequent second pack was prepared as in Example 1.

An adhesive coating was prepared by blending 100 parts by weight of the subsequent first pack with 60 parts by weight of the subsequent second pack by using a mixer machine equipped with a static mixer. This adhesive was coated onto the skin layer at coat weight of 35 to 40 g/m². Then the Backing 2 was laminated onto the layer of adhesive while the coating machine speed was maintained at 2.0 m/min, and the structure was heated in an oven at 150° C. for 10 minutes. Then the Casting Paper was separated from the remainder of the structure.

Example 6

Test of Materials Made in Examples 1–4

Results of tests on Examples 1–4 were as follows:

| Test | Standard | Example 1 | Example 2 | Example 3 | Example 4 |
|---|---|---|---|---|---|
| Cesconi Abrasimeter | UNI-4818-15a: 1992[1] | NT[5] | OK after 8,000 cycles | OK after 8,000 cycles | OK after 2,500 cycles |
| Bally | UNI-4818-13 1992 | NT[5] | 100,000 to 150,000 cycles | 6,000 to 10,000 cycles | 10,000 cycles |
| Dry Delamination | UNI 2411-2001[2] | 1.8 kg/cm | 0.92 kg/cm[3] | 1.0 kg/cm | 1.70 kg/cm |
| Wet Delamination | UNI 2411-2001[2] | 1.8 kg/cm | 0.90 kg/cm[3] | 0.90 kg/cm | 1.10 kg/cm |
| Hydrolysis by Jungle | ISO 1419/C | 14 days | 14 days | 14 days | 14 days |
| MEK Resistance | UNI 4818-28-1992 | NT[5] | resistant | resistant | resistant |
| Sun test | UNI 7805[4] | 24 hr: 6 | 32 hr: 8 | 24 hr: 8 | 24 hr: 8 |

Notes:

[1] with 3 kg weight on top of brush

[2] load (in kg) per cm of sample width

[3] substrate broke

[4] resistance rating on blue scale after hours shown

[5] not tested

Results of further tests on Examples 1 and 4 were as follows:

| Test | Standard | Example 1 | Example 4 |
|---|---|---|---|
| Dry Washing | UNI 3175 1-2 | Resists 5 washings | Resists 5 washings |
| Martindale Abrasimeter Method A[6] | SATRA PM31 B - 1997 | 10,000 cycles | 3,200 cycles |

Notes:
[6]12 kPa load; moderate alteration after number of cycles shown

Example 7

Stability of First Pack of Example 1

The first pack of Example 1 was made and stored at ambient temperature (15 to 30° C.) and tested after after various storage times. Tests were % NCO and viscosity (Brookfield, #3 spindle, 20 rpm, 25° C.). Results were as follows:

| Time (days) | % NCO | Viscosity (mPa*s) |
|---|---|---|
| 0 | 12.8 | 34,600 |
| 17 | 12.7 | |
| 70 | 12.2 | 42,250 |
| 114 | 12.1 | |
| 205 | 11.7 | |
| 237 | 11.7 | 73,900 |

Example 8

Stability of Subsequent First Pack of Example 1

The subsequen first pack of Example 1 was made and stored at ambient temperature (15 to 30° C.) and tested after after various storage times. Tests were % NCO and viscosity (Brookfield, #3 spindle, 20 rpm, 25° C.). Results were as follows:

| Time (days) | % NCO | Viscosity (mPa*s) |
|---|---|---|
| 0 | 13.4 | 1,910 |
| 10 | 13.2 | 2,080 |
| 22 | 13.1 | |
| 60 | 13.0 | 2,135 |
| 107 | 12.8 | |
| 230 | 12.8 | 2,750 |

Example 10

A polyester-polyether polyurethane coating on textile was made.

First, a top coat was prepared as in Example 1. The topcoat was coated onto Casting Paper Petalo Silver (by CdC Favini Group) and heated in an oven at 120° C. for 2 minutes. Wet coat weight was 20 g/m2, and dry coat weight was 12 g/m2.

A first pack was prepared as in Example 1.

A second pack was prepared as in Example 1.

A skin coating was prepared by mixing for 10 seconds with a Cowles™ mixer, 63.65 g of the first pack (heated at 60° C.) and 36.35 g of the second pack (heated at 45° C.) with 2.0 g of pigment paste (Icopor™ IK 304 Bleu). The skin coating was immediately applied on the topcoat at coat weight of 25 g/m$^2$ using a blade thickness equal to 0.025 mm. The skin coating was heated into an oven at temperature of 120° C. for 2 minutes.

A subsequent first pack was prepared, as follows:

513 g of 4,4'-diphenylmethane diisocyanate was added, under dry nitrogen, to 486.8 g of a polyether polyol (polypropylene glycol), with a functionality of 2 and with 1020 equivalent weight, and 0.14 g phosphoric acid in a 3 l flask in a heating bath equipped with a stirrer, a thermometer and a reflux condenser. The reaction mixture was stirred at 80° C. until the theoretical % NCO was reached. This product had %NCO of 13.2%, Brookfield viscosity of 530 mPa*s at 45° C. (spindle #3, 100rpm) and 100% solid content.

A subsequent second pack was prepared, as follows:

308.6 g of 4,4'-diphenylmethane diisocyanate were added, under dry nitrogen, to 630.4 g of a polyether polyol (polypropylene glycol), with a functionality of 2 and with 1020 equivalent weight in a 3 l flask in a heating bath equipped with a stirrer, a thermometer and a reflux condenser. The reaction mixture was stirred at 80° C. until the theoretical % NCO was reached. After cooling at 50° C. 877.7 g of the same polyether polyol were added; when the temperature reached 40° C., also 183.3 g mono ethylene glycol were added. The reaction mixture was stirred at 75° C. until the NCO is completely disappeared in the IR spectrum.

After cooling at 30° C., 3.6 g of 1,8-diazabicyclo[5.4.0] undec-7-ene (DBU) were added to the product containing hydroxyl groups. This product had calculated average OH number of 180 mgKOH/g, Brookfield viscosity of 14000 mPa*s at 25° C. (spindle 6, 50 rpm) and 100% solid content.

An adhesive coating was prepared by blending, with a Cowles™ mixer, 50 g of the subsequent first pack (heated at 45° C.) and 50 g of the subsequent second pack. This adhesive was immediately coated onto the skin layer at coat weight of 15 g/m$^2$. Then the Backing 1 was laminated onto the layer of adhesive and the structure was heated in an oven at 120° C. for 2 minutes. Then the Casting Paper was separated from the remainder of the structure.

It is expected that the resulting structure would have useful properties if tested by the test methods reported in Example 6.

I claim:

1. A two-pack composition for making urethane-containing structures, said composition comprising
    (a) a first pack comprising at least one reaction product of at least one polyisocyanate selected from the group consisting of aliphatic polyisocyanates, 4,4'-diphenylmethane diisocyanate, 2,4'-diphenylmethane diisocyanate, and mixtures thereof, and at least one first compound with plural active hydrogens, wherein said first pack has %NCO of 1% or greater, and
    (b) a second pack comprising at least one second compound with plural active hydrogens; at least one amine catalyst that is a diazabicyclo compound; optionally one or more additional catalyst that is an organometallic compound; and optionally one or more ingredient that is not an isocyanate, not a compound with plural active hydrogens, and not a catalyst;
wherein compounds with plural active hydrogens in said second pack are all chosen from polyester polyols, polyether polyols, monoether polyols, alkane diols, and mixtures thereof; wherein the reactive mixture formed by admixing said first pack and said second pack is capable of curing in the absence of water; and wherein said reactive mixture comprises less than 3% solvent by weight based on the weight of said reactive mixture.

2. The composition of claim 1 wherein said reactive mixture, after curing, has density of 0.9 g/cm³ or greater.

3. The composition of claim 1 wherein said reactive mixture comprises less than 1% solvent by weight based on the weight of said reactive mixture.

4. The composition of claim 1, wherein the sole polyisocyanate used in forming the reaction product in said first pack is 4,4'-diphenylmethane diisocyanate.

5. The composition of claim 1, wherein said first pack has % NCO of 3% or higher.

6. The composition of claim 1, wherein said second pack additionally comprises one or more organometallic catalyst.

7. The composition of claim 6, wherein said organometallic catalyst in said second pack is one or more catalyst of the structure

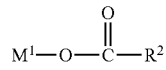

wherein $M^1$ is a metal and wherein $R^2$ is an alkyl group with more than 6 carbon atoms.

8. The composition of claim 6, wherein said organometallic catalyst in said second pack is zinc neodecanoate, bismuth 2-ethylhexanoate, bismuth neodecanoate, or a mixture thereof.

9. The composition of claim 1, wherein said second pack consists of at least one second compound with plural active hydrogens; at least one amine catalyst that is a diazabicyclo compound; and optionally one or more additional catalyst that is an organometallic compound.

* * * * *

UNITED STATES PATENT AND TRADEMARK OFFICE
CERTIFICATE OF CORRECTION

PATENT NO. : 7,658,974 B2 Page 1 of 1
APPLICATION NO. : 11/113713
DATED : February 9, 2010
INVENTOR(S) : Sebastiano Failla It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1119 days.

Signed and Sealed this

Thirtieth Day of November, 2010

David J. Kappos
*Director of the United States Patent and Trademark Office*